(12) United States Patent
Batsura et al.

(10) Patent No.: US 10,768,985 B1
(45) Date of Patent: Sep. 8, 2020

(54) ACTIVE DIRECTORY ORGANIZATIONAL UNIT-BASED DEPLOYMENT OF COMPUTING SYSTEMS

(71) Applicant: Parallels International GmbH, Schaffhausen (CH)

(72) Inventors: Yuriy Batsura, Moscow (RU); Nikolay Dobrovolskiy, Moscow (RU); Serguei M. Beloussov, Costa del Sol (SG)

(73) Assignee: PARALLELS INTERNATIONAL GMBH, Schaffhausen (CH)

( * ) Notice: Subject to any disclaimer, the term of this patent is extended or adjusted under 35 U.S.C. 154(b) by 246 days.

(21) Appl. No.: 15/833,028

(22) Filed: Dec. 6, 2017

(51) Int. Cl.
| | |
|---|---|
| *G06F 9/445* | (2018.01) |
| *G06F 9/50* | (2006.01) |
| *G06F 8/61* | (2018.01) |
| *G06F 16/14* | (2019.01) |

(52) U.S. Cl.
CPC .............. *G06F 9/5011* (2013.01); *G06F 8/61* (2013.01); *G06F 16/148* (2019.01)

(58) Field of Classification Search
None
See application file for complete search history.

(56) References Cited

U.S. PATENT DOCUMENTS

| | | | | |
|---|---|---|---|---|
| 7,802,174 | B2* | 9/2010 | Teng | ........................ G06F 21/41 |
| | | | | 715/200 |
| 10,433,233 | B2* | 10/2019 | Li | ........................ H04W 40/20 |
| 2006/0015505 | A1* | 1/2006 | Henseler | .................. G06F 9/50 |
| 2006/0195420 | A1* | 8/2006 | Kilroy | ................. G06F 16/2471 |
| 2006/0195427 | A1* | 8/2006 | Kilroy | ................. G06F 16/2454 |
| 2007/0011485 | A1* | 1/2007 | Oberlin | ................. G06F 9/5072 |
| | | | | 714/4.1 |
| 2008/0109396 | A1* | 5/2008 | Kacin | .................. G06F 16/954 |
| 2014/0046997 | A1* | 2/2014 | Dain | .................. H04L 67/2861 |
| | | | | 709/201 |
| 2015/0006494 | A1* | 1/2015 | Watt | ....................... G06Q 10/06 |
| | | | | 707/694 |
| 2015/0139002 | A1* | 5/2015 | Lee | ....................... H04W 24/08 |
| | | | | 370/252 |
| 2018/0083944 | A1* | 3/2018 | Vats | .................... H04L 63/0815 |
| 2018/0092021 | A1* | 3/2018 | Li | .......................... H04W 4/70 |

* cited by examiner

*Primary Examiner* — Anna C Deng
(74) *Attorney, Agent, or Firm* — Lowenstein Sandler LLP (57) ABSTRACT

Disclosed are systems and methods for deploying a distributed computing system. A domain controller manages a domain comprised of a plurality of computer objects each having an assigned system role. The described technique includes receiving a system configuration of a distributed directory-service-based system, wherein the system configuration specifies a path to a root organizational unit (OU) within the domain. The technique includes generating group policy objects based on system requirements for each system roles, creating an organizational unit (OU) for each system role, linking each group policy object for each system role to the corresponding created OU, and moving computer objects to an OU according to the system role. The described deployment technique is performed according to a distribution scheme generated based on a number of the system roles and computer objects of each system role.

20 Claims, 7 Drawing Sheets

ACTIVE DIRECTORY ORGANIZATIONAL UNIT-BASED DEPLOYMENT OF COMPUTING SYSTEMS

FIELD OF TECHNOLOGY

The present disclosure relates generally to the field of managing computing resources, more specifically, to systems and methods of deploying a distributed computing system.

BACKGROUND

Many modern computing services have distributed architectures that are comprised of separate applications or software that provide different functionality yet work together to provide software services to users. By way of example, a web application may have a multi-tier architecture that uses different software modules for performing presentation, control logic, and database functions. In another example, an enterprise computer network may be comprised of computer workstations, a directory service for authenticating users, and software management services that tracks and updates software installed on the different workstations. Distributed systems may also include multiple instances of the same application or software for redundancy purposes, or to scale the capabilities of the software service. For example, a multi-tier application may have a load balancer and multiple front-end servers for handling a larger throughput of client requests.

The deployment and management of distributed computing systems can be costly in large scale environments. Many computers have to be provisioned, configured, tested, and subsequently updated with the appropriate software packages, each software package having the correct configurations to communicate and function with other computing devices in the same environment. Therefore, it is desirable to simplify the deployment and service location problems for large-scale distributed systems, such as in a Microsoft Active Directory® environments.

SUMMARY

Thus, a system and method is disclosed herein for deploying a distributed computing system, and, more particularly, for deploying a distributed computing system in an active directory environment using an organizational unit-based deployment technique.

According to one exemplary aspect, a computer-implemented method for deploying a distributed computing system is provided. The method includes receiving a system configuration of a distributed directory-service-based system, wherein the system configuration specifies a path to a root organizational unit (OU) within a domain of a domain controller, wherein the domain comprises a plurality of computer objects each having an assigned system role; generating, within the domain, one or more group policy objects based on system requirements for each system role; creating, in the root OU of the domain, an organizational unit (OU) for each system role; linking, in the domain, each of the group policy objects for each system role to the corresponding created OU; moving, in the domain, the computer objects to at least one OU according to the system role assigned to each computer object; generating a distribution scheme according to a number of the system roles and computer objects of each system role retrieved from the domain; and deploying a plurality of nodes of the distributed directory-service-based system according to the generated distribution scheme.

In another aspect, the domain controller comprises an Active Directory service.

In another aspect, receiving the system configuration of a distributed directory-service-based system further includes modifying the computer objects using an LDAP filter to assign the plurality of system roles to computer objects having a name that matches a query string.

In another aspect, the method further includes creating a new OU as the root OU according to the path specified by the system configuration.

In another aspect, the distribution scheme is represented by a table comprising name fields, network address fields, directory path fields, and system role fields, such that a name is resolved into a network address and a directory path is resolved into a system role.

In another aspect, deploying the plurality of nodes of the distributed directory-service-based system according to the generated distribution scheme further includes iterating through the distribution scheme, and for each computing device in the domain: establishing a connection to the computing device at the network address specified by the distribution scheme; copying, to first computing device, a software package associated with a role assigned to the computing device according to the distribution scheme; remotely installing the software package on the computing device; and transmitting a name, network address, and role identifier specified by the distribution scheme to a system core component to initialize the installed software package.

In another aspect, the system roles comprise a publishing agent, a gateway a remote desktop service agent, and a virtual desktop infrastructure agent.

According to another exemplary aspect of the present disclosure, a system for deploying a distributed computing system is provided. The system includes a hardware processor configured to: receive a system configuration of a distributed directory-service-based system, wherein the system configuration specifies a path to a root organizational unit (OU) within a domain of a domain controller, wherein the domain comprises a plurality of computer objects each having an assigned system role; generate, within the domain, one or more group policy objects based on system requirements for each system role; create, in the root OU of the domain, an organizational unit (OU) for each system role; link, in the domain, each of the group policy objects for each system role to the corresponding created OU; move, in the domain, the computer objects to at least one OU according to the system role assigned to each computer object; generate a distribution scheme according to a number of the system roles and computer objects of each system role retrieved from the domain; and deploy a plurality of nodes of the distributed directory-service-based system according to the generated distribution scheme.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for deploying a distributed computing system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
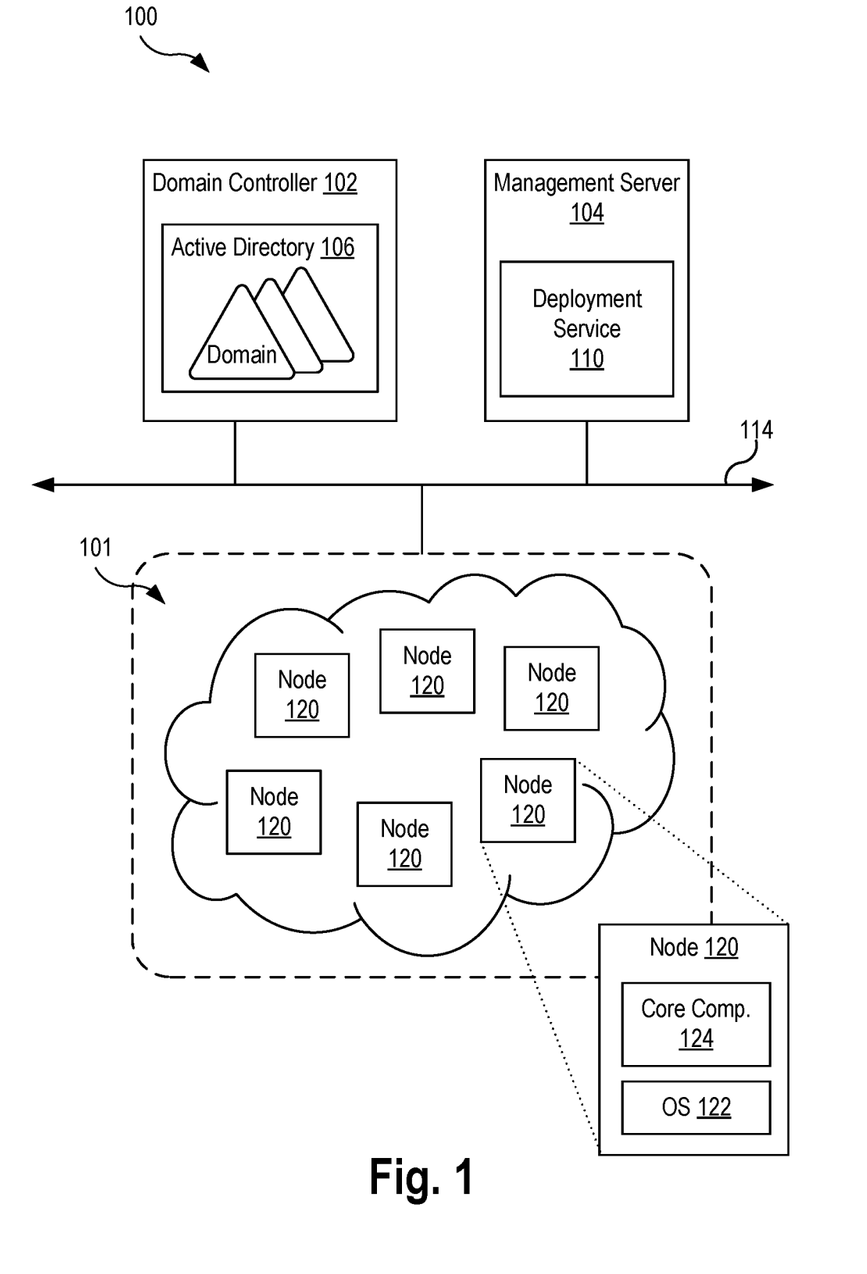
FIG. 1 is a block diagram illustrating a system for deploying a distributed computing system, according to an exemplary aspect.

FIG. 1 is a block diagram illustrating a system 100 for deploying a distributed computing system 101 according to an exemplary aspect. The system 100 may include a domain controller 102 and a management server 104 communicatively connected within a network 114. The system 100 may further include a plurality of nodes 120 on which a distributed system 101 will be deployed. Each node 120 may be a computer server, host, virtual machine, desktop, or other computing device configured to run services or system services that are components of a distributed computing system. The nodes 120 may be local to the system 100 such as within a same data center or site; or remote, such as within a data center in another geographical location, or provided by a third-party organization (e.g., a cloud computing service provider).

The domain controller 102 is configured to manage user authentication, authorization, and permissions within the system 100. The domain controller 102 may be a computer server, host, virtual machine, desktop, or other computing device suitable for running a directory service 106 (interchangeably referred to as Active Directory, or AD). The directory service 106 is configured to store information about members of the "domain", including computing devices and users, verify credentials associated with the computing devices and users, and specify access rights of the computing devices and users. The directory service 106 may be an Active Directory® configured to manage Windows® domain networks, or other directory services such as Apache Directory Server, OpenLDAP, etc. In some aspects, the directory service 106 may expose an interface for programmatic access, such as LDAP (Lightweight Directory Access Protocol) or other AD interface, which enables search, add, remove, and modify operations to be performed on the directory service 106.

Deployment of a distributed system generally involves the following stages. First, target nodes 120 (e.g., virtual machines or physical computing devices) are joined to an Active Directory service. Second, the nodes 120 are grouped by one or more roles, such as management nodes, file share, and terminal servers. Next, group policy objects (GPOs) are created for each group of nodes, and the GPOs are linked to the groups of nodes. Next, required software is delivered and installed to each group of nodes according to their role. Service location is performed for each component within a node, which includes identifying other computers that host specific services. Finally, initialization and post-installation configuration may be performed.

Various tools have been developed that enable these steps to be performed automatically, but the known approaches have numerous drawbacks and limitations. For example, the creation and linking of GPOs to nodes may be done by executing custom scripts (e.g., PowerShell scripts) or performed manually by a system administrator through user interaction with a graphical user interface (e.g., Active Directory Management Console). However, scripting bugs or user error (e.g., typos) in creating the GPOs may cause some services to work improperly or inefficiently, which can take a system administrator many hours to troubleshoot and resolve. Similar errors in linking GPOs to groups of nodes would necessitate a lengthy rolling back process and downtime within the system.

In another example, service location may be highly dependent on a deploying product's features and usually involves management via a graphical user interface of an Active Directory browser to find objects (computer, groups) where the service is installed. If proper services are installed on selected machines, the services have to be initialized (e.g., using an agent-server handshake.) When all services are located and initialized, the services become manageable for post-installation configuration to get ready for use in production. However, when a service is installed, a system administrator has to point out (depending on the system features) where the installed services are located, because core system components may not necessarily be aware about their existence. In another example, software delivery and installation might be set up using Active Directory or GPOs. However, large-scale distributed systems may require additional resources (e.g., shared network storage) from which to deliver the software packages that have to be provided and configured properly. The deployment process can take a long time due to a large number of nodes attempting access to the same resource at a same time.

According to one or more aspect of the present disclosure, a deployment service 110 (e.g., executing on the management server 104) is configured to deploy and configure a distributed Active Directory-based system. As described in greater detail below, to deploy a distributed Active Directory-based system, a system administrator first provides a system configuration for the deployment service 110. The deployment service 110 prepares the plurality of nodes 120 for deployment according to a preparation algorithm described below and based on communications with the Active Directory 106. The deployment service 110 then deploys the distributed system on the plurality of nodes according to a deployment algorithm described below.

In one aspect, the deployment service 110 may be configured to receive a system configuration that will be used to deploy the distributed computing system. The deployment service 110 may be provided (e.g., via input from a system administrator) with credentials of an Active Directory user that will be used to access, query, and modify the Active Directory 106.

In some aspects, the system configuration may include a path to an existing root organizational unit (OU), or an indication of where to create a new root OU. An organizational unit refers to an object container within the Active Directory 106 capable of containing other objects in the directory, including objects representing users, machines, and other organizational units. The deployment service 110 may be configured to create a root OU (within the Active Directory 106) which is configured to store all objects representing the distributed system 101 to be deployed.

In some aspects, the system configuration may specify a plurality of system roles associated with an active-directory-based system. As used herein, a role refers to a type of service provided by a component of the distributed system 101. In some aspects, one or more roles may be assigned to the Active Directory computers (e.g., nodes 120) using an LDAP filter. The LDAP filter may be used to identify nodes' roles based on their OU path. For example, the deployment service 110 may assign a role "Terminal Server" to all computers having a name that matches a pattern "TS*" and located within the path "OU=Computers, DC=domain, DC=dom". In some aspects, the role may be represented implicitly according to the hierarchical relationship between a particular OU and the role assigned to its members. In other aspects, a value representing the system role may be expressly stored as an attribute (e.g., "role='Terminal Server'") of the directory entries within the Active Directory 106 associated with the computers.

In some aspects, each of the nodes 120 may be prepared with a base installation of software packages, i.e., an operating system 122 is installed on each node 120. In some aspects, a core system component 124 is installed on at least one of the nodes 120. The core system component 124 may include a plurality of applications, libraries, and other software modules for providing a system management console to the distributed system. For example, in cases of deploying remote application server (RAS), the core system component may be represented as a publishing agent and redundancy service. In another example, in cases of deploying a Citrix® RemoteApp system, the core system component may be represented as a Delivery Controller module. Credentials of the AD users with sufficient permissions to perform the Active Directory actions described herein are provided to the core system component 124. In some alternative aspects, the deployment service 110 may be part of the core system component 124 executing on a node 120, rather than a software module running on a separate management server 104.

Preparation

FIGS. 2A to 2D are block diagrams illustrating operations performed on an Active Directory domain 200 to prepare for deploying a distributed computing system, according to an exemplary aspect.

Figure 2A:
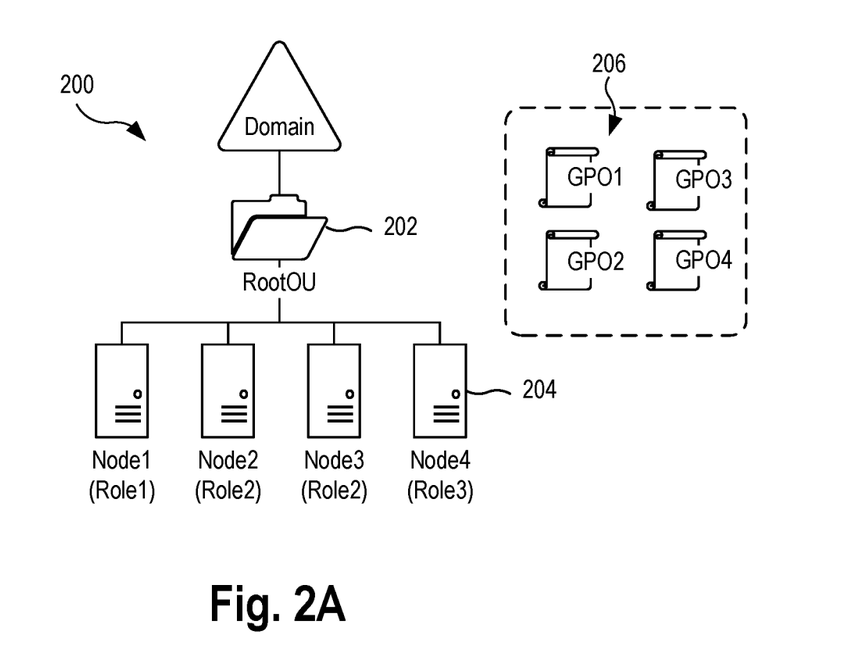
FIGS. 2A to 2D are block diagrams illustrating operations performed on an Active Directory domain to prepare for deploying a distributed computing system, according to an exemplary aspect.

As shown in FIG. 2A, all computer nodes 120 are joined to the domain 200 by adding computer objects 204 ("Node1", "Node2", "Node3", "Node4") representing each node 120 as a member of the domain 200. For simplicity of explanation, a computer object 204 may be referred to by a node that it represents. Each node 204 has been assigned a system role ("Role1", "Role2", "Role3"). Multiple nodes may have the same assigned role based on the particular architecture of the distributed system to be deployed, e.g., Node2 and Node3 have been both assigned Role2 for scale or redundancy purposes.

The deployment service 110 adds the nodes 204 to the domain 200 as objects contained within an existing root OU 202 ("RootOU") according to a path name specified by the system configuration (provided to the deployment service 110). In some aspects, the deployment service 110 may create a new root OU 202 according to an AD path and name specified by the system configuration. For example, the deployment service 110 may create a new root OU 202 having a common name "RootOU" and an AD path of "DC=domain, DC=dom".

In some aspects, the deployment service 110 may be configured to (e.g., via AD access) create one or more group policy objects 206 based on system requirements for each system role within the domain 200. Group policy objects (GPOs) 206 are objects that specify settings, configurations, and permissions that are applied to one or more AD users and/or AD computers. GPOs 206 may be linked to an organizational unit to apply those settings, configurations, and permissions based on inheritance via a hierarchy of the domain, i.e., to apply those configurations to all objects (e.g., users, computers) inside of the organizational unit.

In some aspects, the deployment service 110 may query the Active Directory 106 for all unique system role attributes of the nodes 204 that are contained in the root organizational unit 202, for example, using a filter query string:

"(& (objectCategory=computer) (memberOf=, ou=RootOU, dc=Domain, dc=com))"

In a given distributed system, each system role has certain system requirements, i.e., settings, configurations, and permissions to be applied on a node executing in that role in order to function properly within the distributed system. Each system role may be mapped to a group policy template that includes a plurality of pre-determined settings, configurations, and permissions that implement the system requirements of the system role. The generated group policy objects 206 may specify firewall settings, remote access settings, Windows roles, and feature configurations, for a node. For example, the deployment service 110 may generate a GPO associated with a public-facing gateway role that enables open network access from clients on TCP ports 2000 and 20030. The deployment service 110 may then generate a second GPO associated with an internal database role that allows limited network access only to certain pre-determined components. In some aspects, the deployment service 110 may generate, for a system role, a single group policy object 206 that includes all configurations for that role. In other aspects, the deployment service 110 may generate, for a system role, multiple group policy objects 206 that each include a certain category of configurations (e.g., one GPO for only network settings, another GPO for feature configurations) and that cumulatively provide all configurations for that role. In the example shown in FIG. 2A, the deployment service 110 creates four group policy objects 206 ("GPO 1", "GPO 2", "GPO 3", "GPO 4") associated with the identified system roles "Role1", "Role2", and "Role3".

Figure 2B:
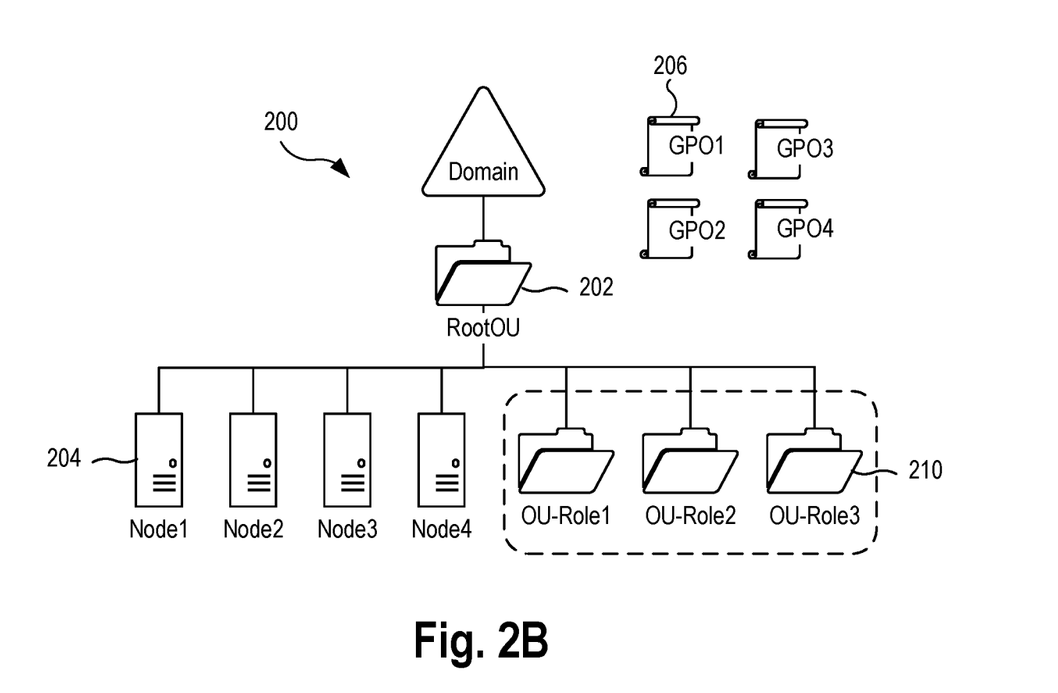

As shown in FIG. 2B, the deployment service 110 may be configured to create an organizational unit (OU) 210 for each system role in the root OU 202. As mentioned earlier, an organizational unit 210 is a hierarchical element within a domain 200 in which objects representing users, groups, computers, and even other organizational units may be placed. The deployment service 110 may create (e.g., via AD operations) new OUs 210 that are contained within the root OU 202 and having names representing the associated system role. For example, the deployment service 110 creates three OUs 210 ("OU-Role1", "OU-Role2", "OU-Role3").

Figure 2C:
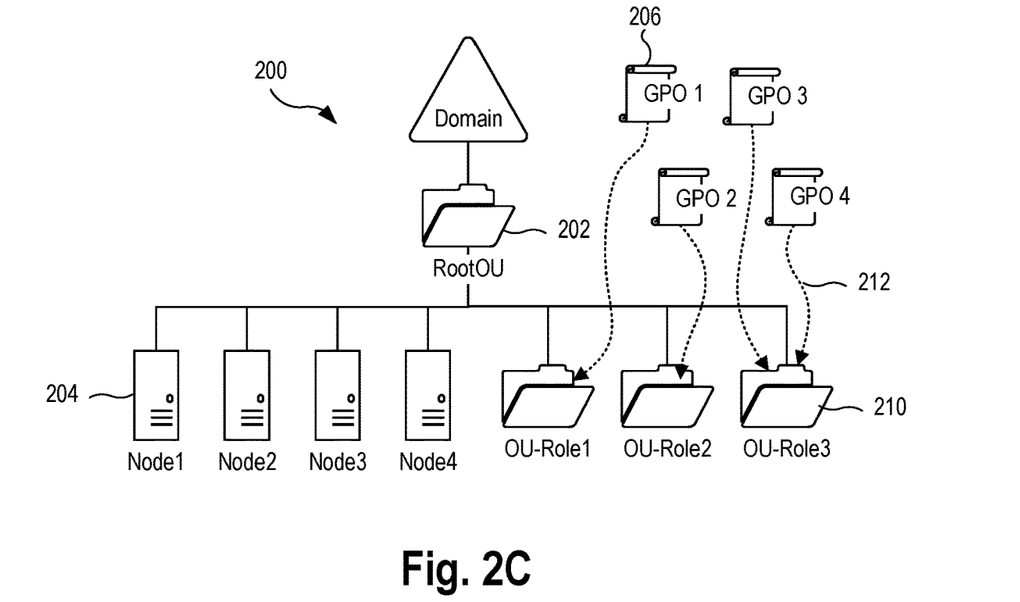

As shown in FIG. 2C, the deployment service 110 may be configured to link each of the group policy objects 206 for each system role to a corresponding OU 210. A group policy object 206 applied to an organizational unit 210 applies directly to all users and computers in the organizational unit 210 and by inheritance to all users and computers in organizational units farther down the Active Directory tree. In the example shown, the deployment service 110 links (e.g., via AD operation 212) a first group policy object "GPO 1" to a first organizational unit "OU-Role1", a second group policy object "GPO 2" to a second organizational unit "OU-Role2", and a third and fourth group policy objects "GPO 3" and "GPO 4" to a third organizational unit "OU-Role3".

Figure 2D:
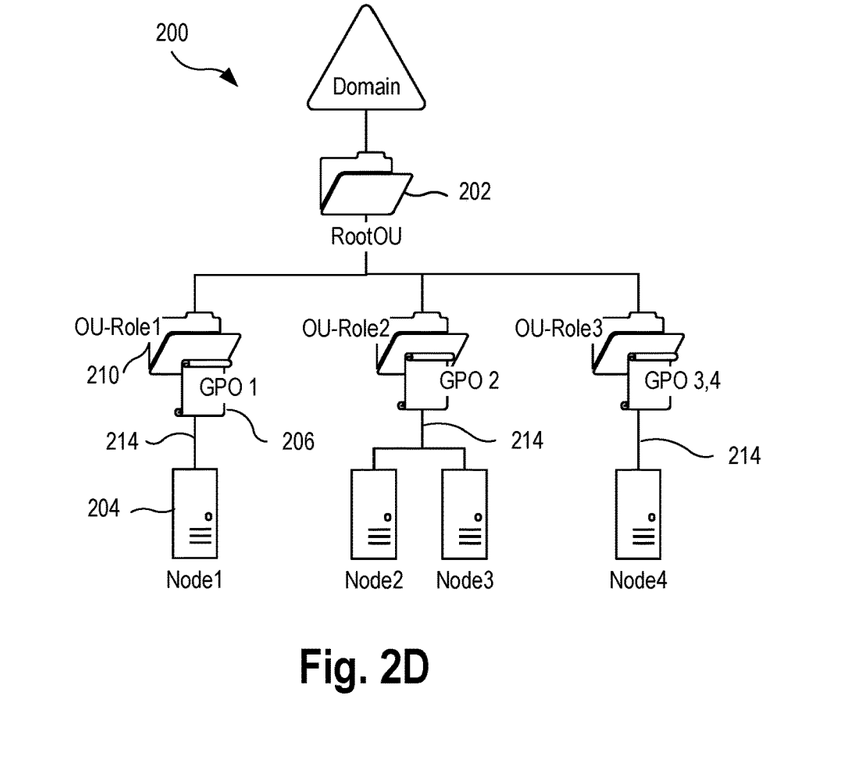

As shown in FIG. 2D, the deployment service 110 may be configured to move computers to a corresponding OU 210 according to the role assigned to each computer. In the example shown, the deployment service 110 moves (e.g., via AD operation) a first node "Node1" to the created organizational unit "OU-Role1" according to the system role "Role1" assigned to "Node1"; the nodes "Node2" and "Node3" having the system role "Role2" to the organizational unit "OU-Role2"; and the node "Node4" having the system role "Role3" to the organizational unit "OU-Role3", as represented by the connections 214.

In one or more aspects, the deployment service 110 may be configured to create a distribution scheme according to the number of roles and computer of each role. In some aspects, the created distribution scheme may be represented in the form of a table listing the plurality of computer nodes 120 (as rows), and their respective NAME, network address (IP), OU path, and ROLE (as columns). An example of a distribution scheme is shown in Table 1 below.

TABLE 1

Example Deployment Scheme

| index | NAME | IP | OU PATH | ROLE |
|---|---|---|---|---|
| 1 | TS-0042 | 12.24.0.42 | OU = RDS, OU = RootOU, DC = domain, DC = dom | Remote Desktop Services Session Host |
| 2 | HYPERV01 | 122.24.2.12 | OU = VDI, OU = RootOU, DC = domain, DC = dom | Hyper-V VDI Server |
| 3 | HYPERV02 | 122.24.2.13 | OU = VDI, OU = RootOU, DC = domain, DC = dom | Hyper-V VDI Server |
| 4 | GATEWAY13 | 20.25.20.25 | OU = Gateways, OU = RootOU, DC = domain, DC = dom | Client Secure Connection Gateway |

In some aspects, the distribution scheme is created where a NAME field resolves into an IP field (using DNS) and an OU PATH field resolves into a ROLE field (this relation is built-in). An example method for generating the deployment scheme is described further below in conjunction with FIG. 5.

Figure 5:
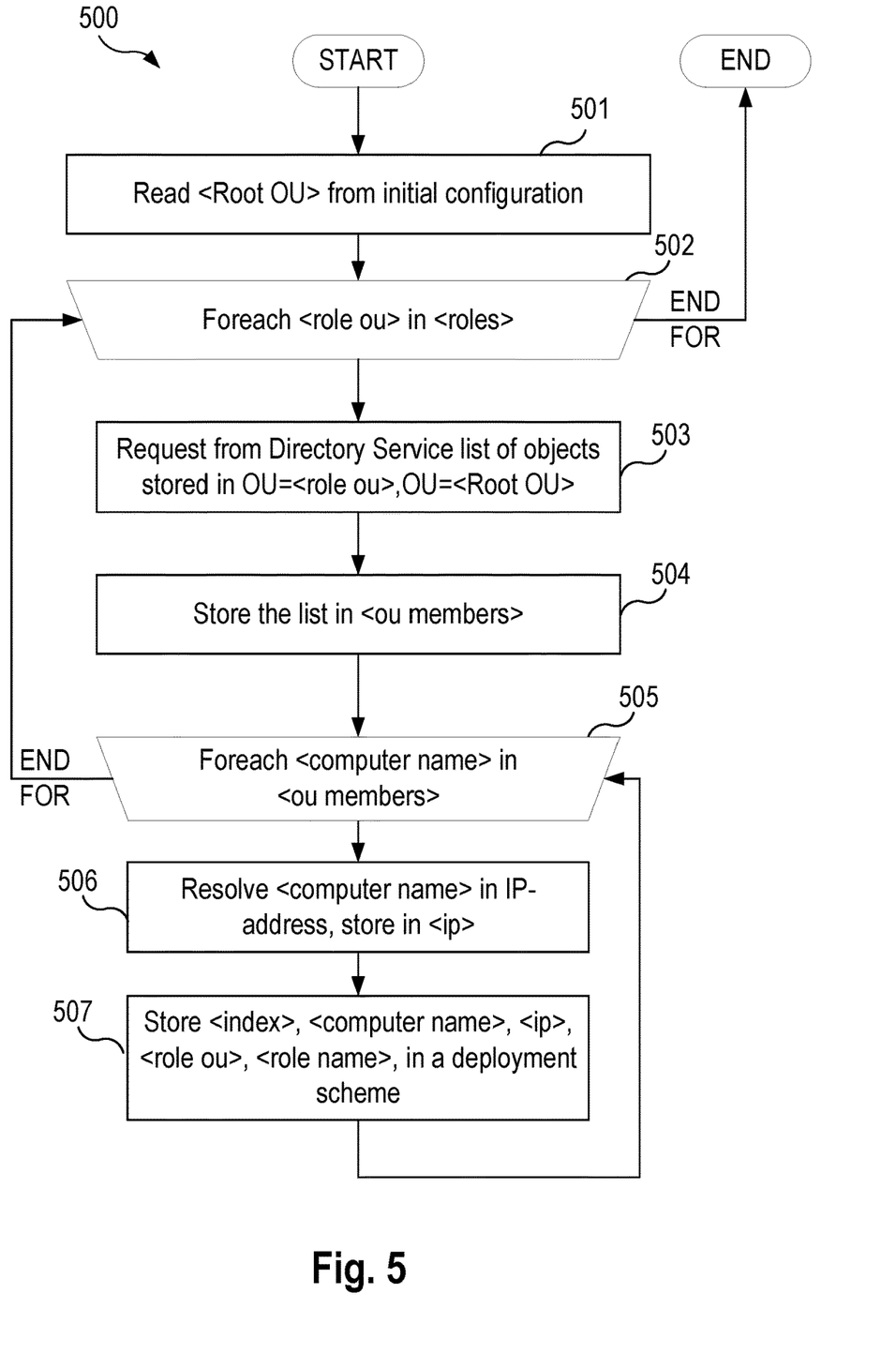
FIG. 5 is a flowchart illustrating a method for generating a deployment scheme for a distributed computing system according to an exemplary aspect.

FIG. 5 is a flowchart illustrating a method 500 for generating a deployment scheme for a distributed computing system according to an exemplary aspect. The method 500 begins at step 501 in which the deployment service 110 reads the <Root OU> from the initial configuration provided. For example, the deployment service 110 may read the AD name and path to the root OU as previously provided by a system administration or configuration file bundled with the deployment packages.

At step 502, the deployment service 110 may iterate through <roles>, which is a system-specific predefined collection that contains a mapping between <role name> and <role ou>. For example, the deployment service 110 may iterate through a mapping between identifiers for role names (e.g., "Hyper-V VDI Server") and a corresponding OU name (e.g., "VDI").

For each <role ou>, at step 503, the deployment service 110 may request from the directory service 106 a list of objects stored in the role OU that is a member of the root OU. For example, the deployment service 110 may query for a list of objects from the directory service 106 using a query string "OU=<role ou>,OU=<Root OU>". At step 504, the deployment service 110 may store the list in a separate OU members collection (<ou members>) associated with that <role ou>.

For each <computer name> in the <ou members> collection: at step 506, the deployment service 110 resolves the <computer name>into a network address (e.g., IP address), and stores the IP address as <ip>. At step 507, the deployment service 110 may then add an entry into the deployment scheme having values for <index>, <computer name>, <ip>, <role ou>, <role name> fields, as determined above. For example, the deployment service 110 may insert a new entry into the deployment scheme being generated that specifies a "1" index, a computer name of "TS-0042", an IP address of "12.24.0.42", a role OU value of "OU=RDS, OU=RootOU, DC=domain, DC=dom", a role name identifier as "Remote Desktop Services Session Host." Steps 506 to 507 may repeat for each computer name in the list of objects retrieved from the directory service 106 (as in step 503). Further, steps 503 to 507 may repeat for each role OU found in the role collection. At the end of the method 500, the deployment scheme has been generated.

Deployment

Referring back to FIG. 1, in one aspect, the deployment service 110 may then deploy a plurality of nodes 120 according to the created distribution scheme. The described technique improves the easy of delivering software, particularly for demonstration, test, and pilot installations. The deployment service 110 may iterate through the distribution scheme, and for each iteration, execute the following deployment process for a computer (e.g., node 120) listed in the distribution scheme. For a given node in the deployment scheme having <IP>, <NAME>, and <ROLE> fields, the deployment service 110 may establish a connection to the node at the network address <IP> using a network file access protocol such as SMB (Server Message Block), copy a software package of the <ROLE>, remotely install the package, and pass the <NAME>, <IP>, and <ROLE> to the core system component 124 to initialize the installed service. For example, to deploy the second node (Index #2)

according to the distribution scheme in Table 1, the deployment service 110 establishes a connection to the computer node at 122.24.2.12, and transfers a software package associated with the Hyper-V VDI Server role. The deployment service 110 installs that software package (e.g., .msi file), and passes the name "HYPERV01", the network address "122.24.2.12", and the role identifier "Hyper-V VDI Server" to the second node.

In other aspects, the deployment service 110 may use a peer-to-peer technique in which each node may redistribute its role other nodes in the group (each OU) to reduce the distribution time of software packages. In this case, the deployment service 110 delegates remote jobs to the nodes and each node gets its own distribution scheme to iterate through (and may even further delegate the jobs further down the hierarchy). For example, one of the VDI Server nodes is designated as responsible for distribution software packages to the other VDI Server nodes contained in the VDI Server OU.

Figure 3:
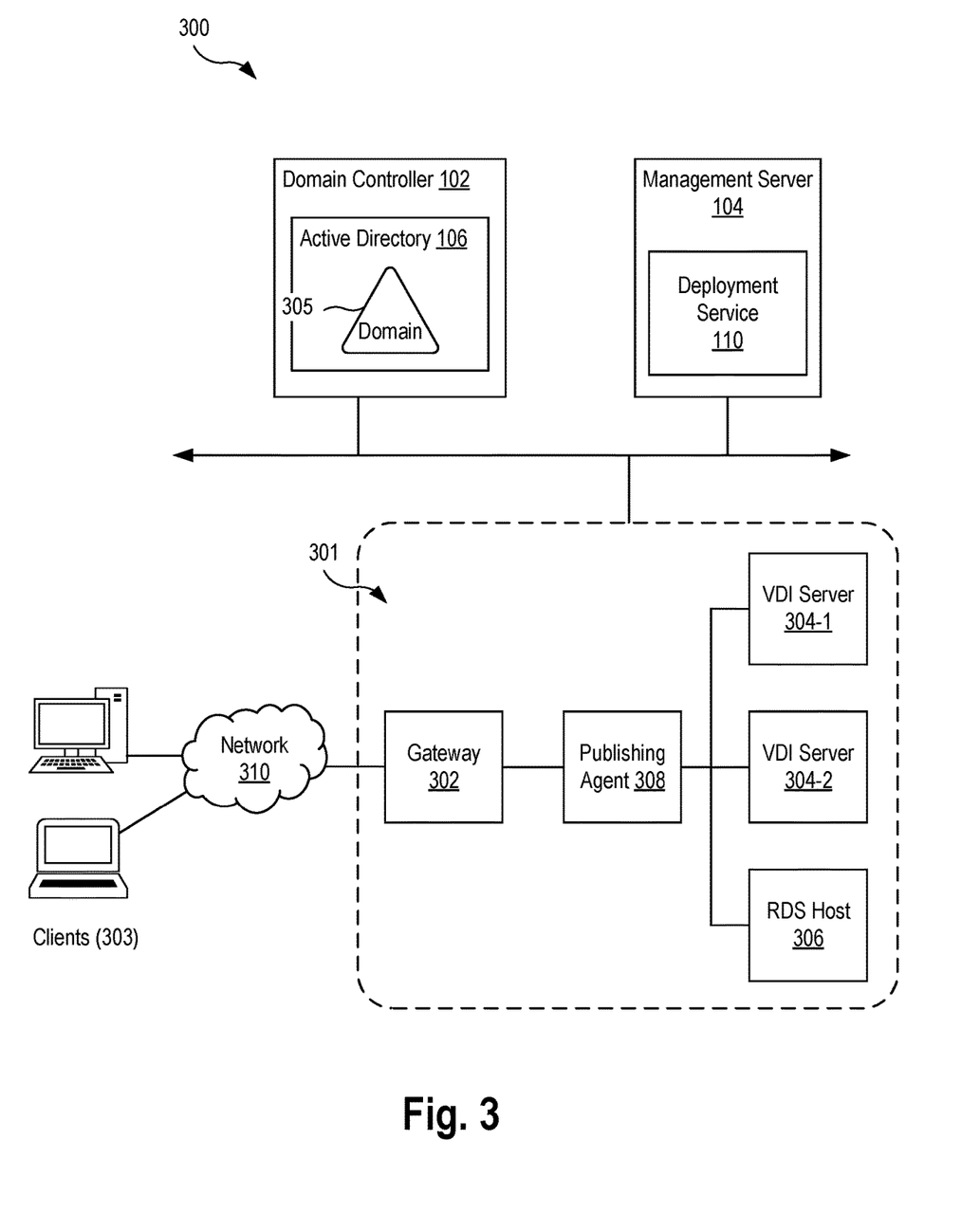
FIG. 3 is a block diagram illustrating a system that has deployed a distributed remote application server system according to an exemplary aspect.

FIG. 3 is a block diagram illustrating a system 300 that has deployed a distributed remote application server system 301 according to an exemplary aspect. The system 300 may include a domain controller 102 having an active directory 106 and a management server 104 having a deployment service 110, similar to the system 100. In the example shown, the deployment service 110 has deployed the distributed remote application server system 301 on the plurality of nodes 120 using a domain 305 stored in the domain controller 102.

The distributed remote application server system 301 may be a virtual application and desktop delivery system that allows users to access and use applications and data from any device, such as client devices 303, over a network 310. In one aspect, the distributed remote application server system 301 may include a gateway service 302, a publishing agent service 308, one or more VDI (Virtual Desktop Infrastructure) servers 304 (e.g., 304-1, 304-2), and an RDS (Remote Desktop Services) host 306. The system 300 further includes the domain controller 102 having an Active Directory 106 used by the remote application server system 301 to manage users and resources, for example, to authenticate and validate users attempting to establish remote sessions with the remote application server. As described herein, this Active Directory 106 is also used to facilitate the deployment of the remote application server system 301 itself.

In some aspects, the gateway service 302 may be configured to act as a proxy between remote session clients (e.g., executing on client devices 303) and the remote application server system 301, for example, by encrypting communications. The publishing agent service 308 is configured to provide access to published application and desktops, as well as load balances application traffic. The VDI servers 304 may be configured to provide a virtual desktop environment, sometimes referred to as a virtual desktop infrastructure (VDI) for executing applications and accessing data (e.g., private files). The VDI servers 304 may include a VDI agent (e.g., executing as a service application or virtual appliance) to provide an interface for managing a hypervisor, and each virtual machine executing on the VDI server may have a guest agent installed in the guest operating system of the virtual machine. The RDS host 306 may be a terminal server configured to enable publication of the server resources (e.g., applications and desktop). It is understood that other aspects of a remote application server may include additional components arranged in different architectures. For example, a remote application server might further includes system roles for a high-availability load-balancing service, a web portal, a management console service, and a remote PC agent service.

As such, the distributed remote application server system 301 include the different system roles of a gateway, a publishing agent, a VDI server, and an RDS host. Each of these roles require specific Group Policy settings in order to function properly (for example, firewall and user access settings). The publishing agent service 308 includes agent-pushing technology which is able to deploy specific system components to a specified host within the system 301. Under previous approaches, the publishing agent service 308 might require that an address and role for each component be specified (one-by-one) via a graphical user interface or using a scripting interface (e.g., PowerShell).

According to aspects of the present disclosure, the deployment service 110 may use an Active-Directory-based deployment scheme for mapping roles (e.g., gateway, publishing agent, VDI server, RDS host, etc.) to hosts (nodes 120), such that, given an initial system configuration, the deployment service is able to provide an end-to-end deployment, making misconfiguration and GPO conflicts unlikely. Aspects of the present disclosure provides improved consistency of the deployment process, where configuration, delivery, service discovery, and initialization are combined in a single automated process. The described technique prevents system administrators from making errors which are difficult to troubleshoot and fix. By using the existing Active Directory service (that is used for managing users in the distributed system), the described technique re-uses the system's own infrastructure to deliver software packages, without needing to set up single-purpose AD directory service and additional file servers for the sole purpose of deployment. Furthermore, the described technique makes the structure of the AD objects representing the system nodes well-organized and manageable compared to other approaches.

Figure 4:
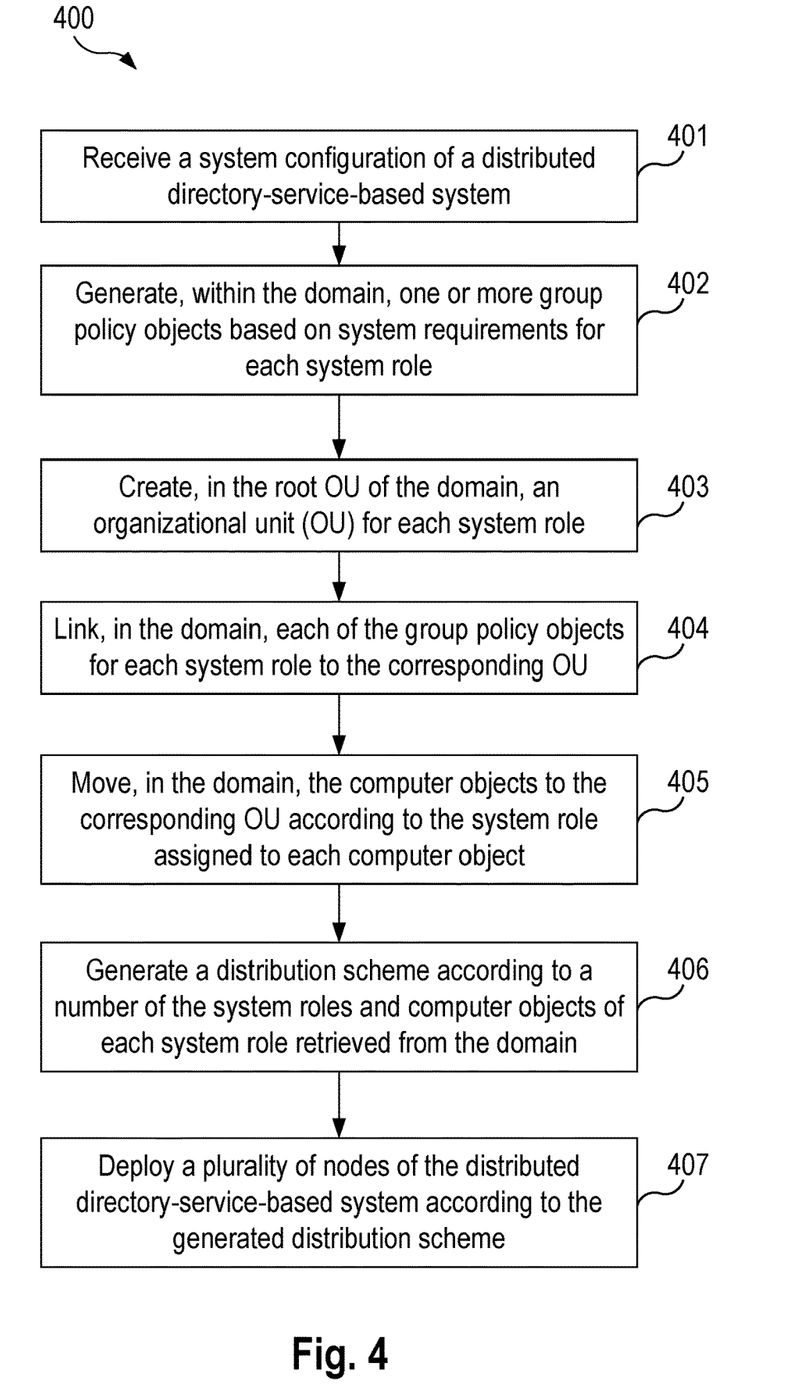
FIG. 4 is a flowchart illustrating a method for deploying a distributed computing system according to an exemplary aspect.

FIG. 4 is a flowchart illustrating a method 400 for deploying a distributed computing system according to an exemplary aspect. It is noted that the following description of the exemplary method makes reference to the system and components described above.

The method 400 begins at step 401, in which the deployment service 110 receives a system configuration of a distributed directory-service-based system 101. The system configuration specifies a path to a root organizational unit (OU) 202 within a domain 305 of a domain controller 102. The domain 305 comprises a plurality of computer objects (e.g., objects 204) each having an assigned system role. For example, the system roles may include a publishing agent, a gateway a remote desktop service agent, and a virtual desktop infrastructure agent. In some aspects, the domain controller comprises an Active Directory service. In some aspects, the deployment service 110 may modify the computer objects using an LDAP filter to assign the plurality of system roles to computer objects having a name that matches a query string.

At step 402, the deployment service 110 generates, within the domain, one or more group policy objects based on system requirements for each system role. For example, the deployment service 110 may use create GPOs for the roles of a gateway, a publishing agent, a VDI server, and an RDS host. Each of such GPOs specify settings and configurations, for example, by opening certain ports for the VDI server role, and closing other ports in the publishing agent. In some aspects, if needed, the deployment service 110 may create a new OU as the root OU according to the path specified by the system configuration.

At step 403, the deployment service 110 creates, in the root OU of the domain, an organizational unit (OU) for each system role. For example, the deployment service 110 may create a first OU associated with the gateway system role, a second OU associated with a publishing agent role, a third OU associated with VDI server role, and a fourth OU associated with the RDS host role.

At step 404, the deployment service 110 links, in the domain, each of the group policy objects for each system role to the corresponding created OU. At step 405, the deployment service 110 moves, in the domain, the computer objects to at least one OU according to the system role assigned to each computer object.

At step 406, the deployment service 110 generates a distribution scheme according to a number of the system roles and computer objects of each system role retrieved from the domain. In some aspects, the distribution scheme is represented by a table comprising name fields, network address fields, directory path fields, and system role fields, such that a name is resolved into a network address and a directory path is resolved into a system role.

At step 407, the deployment service 110 deploys a plurality of nodes of the distributed directory-service-based system according to the generated distribution scheme. In some aspects, the deployment service 110 may iterate through the distribution scheme, and for each computer device (say, a first computing device), perform the following procedure. The deployment service 110 establishes a connection to the first computing device at the network address specified by the distribution scheme, copies, to the first computing device, a software package associated with a role assigned to the first computing device according to the distribution scheme, remotely install the software packaged on the first computing device, and transmit a name, network address, and role identifier specified by the distribution scheme to a system core component to initialize the installed service. In some aspects, the deployment process may include establishing a file share connection to the node using a network address of the node as retrieved from the distribution scheme, transferring a software package associated with the role of the node as determined from the distribution scheme, and remotely installing the software package. The deployment process also includes transmitting indications of the name, network address, and role of the node (as retrieved from the distribution scheme) to a core system component 124 pre-installed on the node to initialize the service(s) on the node 120.

Figure 6:
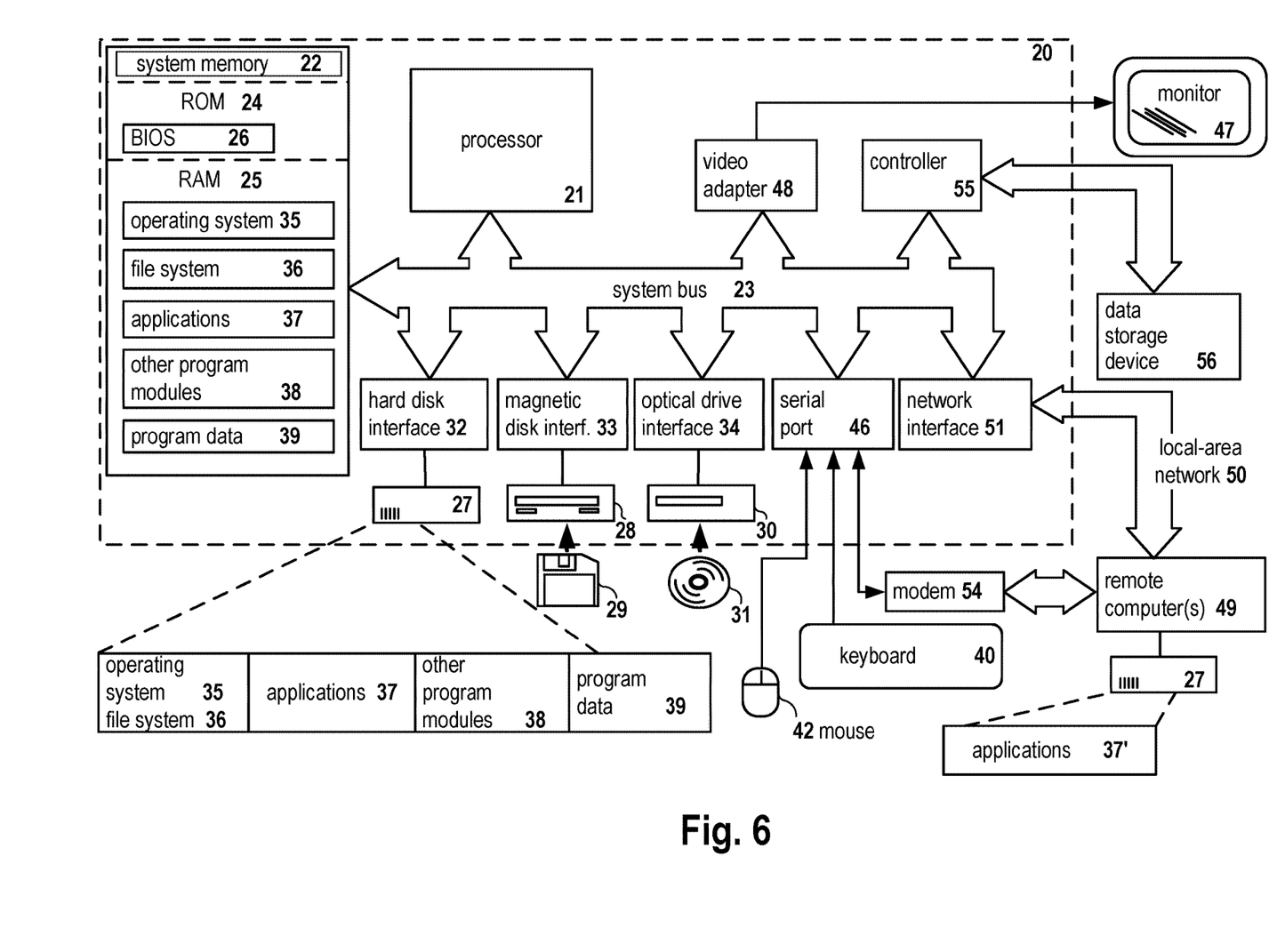
FIG. 6 is a block diagram of a general-purpose computer system on which the disclosed system and method can be implemented according to an exemplary aspect.

FIG. 6 is a block diagram illustrating a general-purpose computer system 20 on which aspects of systems and methods for deploying a distributed computing system may be implemented in accordance with an exemplary aspect. It should be noted that the computer system 20 can correspond to the domain controller 102, management server 104, nodes 120, and client devices 303, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for deploying a distributed computing system, wherein the method comprises:
    receiving a system configuration of a distributed directory-service-based system, wherein the system configuration specifies a path to a root organizational unit (OU) within a domain of a domain controller, wherein the domain comprises a plurality of computer objects each having an assigned system role, wherein each of the plurality of computer objects represents a node configured to run a service of a plurality of services of the distributed computing system, and wherein the assigned system role represents a type of system service provided by a corresponding node;
    generating, within the domain, one or more group policy objects based on system requirements for each system role, wherein the one or more group policy objects specify settings and permissions for computer objects of a given system role;
    creating, in the root OU of the domain, an organizational unit (OU) for each assigned system role;
    linking, in the domain, each of the group policy objects for each assigned system role to the corresponding created OU;
    moving, in the domain, the computer objects to at least one OU according to the system role assigned to each computer object;
    generating a distribution scheme according to a number of the system roles and computer objects of each system role retrieved from the domain; and
    deploying a plurality of nodes of the distributed directory-service-based system according to the generated distribution scheme.

2. The method of claim 1, wherein the domain controller comprises an Active Directory service.

3. The method of claim 1, wherein receiving the system configuration of a distributed directory-service-based system further comprises:
    modifying the computer objects using an Lightweight Directory Access Protocol (LDAP) filter to assign the plurality of system roles to computer objects having a name that matches a query string.

4. The method of claim 1, further comprising:
    creating a new OU as the root OU according to the path specified by the system configuration.

5. The method of claim 1, wherein the distribution scheme is represented by a table comprising name fields, network address fields, directory path fields, and system role fields, such that a name is resolved into a network address and a directory path is resolved into a system role.

6. The method of claim 1, wherein deploying the plurality of nodes of the distributed directory-service-based system according to the generated distribution scheme further comprises iterating through the distribution scheme, and for each computing device in the domain:
    establishing a connection to the computing device at the network address specified by the distribution scheme;
    copying, to first computing device, a software package associated with a role assigned to the computing device according to the distribution scheme;
    remotely installing the software package on the computing device; and
    transmitting a name, network address, and role identifier specified by the distribution scheme to a system core component to initialize the installed software package.

7. The method of claim 1, wherein the system roles comprise a publishing agent, a gateway a remote desktop service agent, and a virtual desktop infrastructure agent.

8. A system for deploying a distributed computing system, wherein the system comprises:
  a hardware processor configured to:
    receive a system configuration of a distributed directory-service-based system, wherein the system configuration specifies a path to a root organizational unit (OU) within a domain of a domain controller, wherein the domain comprises a plurality of computer objects each having an assigned system role, wherein each of the plurality of computer objects represents a node configured to run a service of a plurality of services of the distributed computing system, and wherein the assigned system role represents a type of system service provided by a corresponding node;
    generate, within the domain, one or more group policy objects based on system requirements for each system role, wherein the one or more group policy objects specify settings and permissions for computer objects of a given system role;
    create, in the root OU of the domain, an organizational unit (OU) for each assigned system role;
    link, in the domain, each of the group policy objects for each assigned system role to the corresponding created OU;
    move, in the domain, the computer objects to at least one OU according to the system role assigned to each computer object;
    generate a distribution scheme according to a number of the system roles and computer objects of each system role retrieved from the domain; and
    deploy a plurality of nodes of the distributed directory-service-based system according to the generated distribution scheme.

9. The system of claim 8, wherein the domain controller comprises an Active Directory service.

10. The system of claim 8, wherein the processor configured to receive the system configuration of a distributed directory-service-based system is further configured to:
  modify the computer objects using an Lightweight Directory Access Protocol (LDAP) filter to assign the plurality of system roles to computer objects having a name that matches a query string.

11. The system of claim 8, wherein the processor is further configured to:
  create a new OU as the root OU according to the path specified by the system configuration.

12. The system of claim 8, wherein the distribution scheme is represented by a table comprising name fields, network address fields, directory path fields, and system role fields, such that a name is resolved into a network address and a directory path is resolved into a system role.

13. The system of claim 8, wherein the processor configured to deploy the plurality of nodes of the distributed directory-service-based system according to the generated distribution scheme is further configured to iterate through the distribution scheme, and for each computing device in the domain:
  establish a connection to the computing device at the network address specified by the distribution scheme;
  copy, to first computing device, a software package associated with a role assigned to the computing device according to the distribution scheme;
  remotely install the software package on the computing device; and
  transmit a name, network address, and role identifier specified by the distribution scheme to a system core component to initialize the installed software package.

14. The system of claim 8, wherein the system roles comprise a publishing agent, a gateway a remote desktop service agent, and a virtual desktop infrastructure agent.

15. A non-transitory computer readable medium comprising computer executable instructions for deploying a distributed computing system, including instructions for:
  receiving a system configuration of a distributed directory-service-based system, wherein the system configuration specifies a path to a root organizational unit (OU) within a domain of a domain controller, wherein the domain comprises a plurality of computer objects each having an assigned system role, wherein each of the plurality of computer objects represents a node configured to run a service of a plurality of services of the distributed computing system, and wherein the assigned system role represents a type of system service provided by a corresponding node;
  generating, within the domain, one or more group policy objects based on system requirements for each system role, wherein the one or more group policy objects specify settings and permissions for computer objects of a given system role;
  creating, in the root OU of the domain, an organizational unit (OU) for each assigned system role;
  linking, in the domain, each of the group policy objects for each assigned system role to the corresponding created OU;
  moving, in the domain, the computer objects to at least one OU according to the system role assigned to each computer object;
  generating a distribution scheme according to a number of the system roles and computer objects of each system role retrieved from the domain; and
  deploying a plurality of nodes of the distributed directory-service-based system according to the generated distribution scheme.

16. The computer readable medium of claim 15, wherein the domain controller comprises an Active Directory service.

17. The computer readable medium of claim 15, wherein the instructions for receiving the system configuration of a distributed directory-service-based system further comprises instructions for:
  modifying the computer objects using an Lightweight Directory Access Protocol (LDAP) filter to assign the plurality of system roles to computer objects having a name that matches a query string.

18. The computer readable medium of claim 15, further comprising instructions for:
  creating a new OU as the root OU according to the path specified by the system configuration.

19. The computer readable medium of claim 15, wherein the distribution scheme is represented by a table comprising name fields, network address fields, directory path fields, and system role fields, such that a name is resolved into a network address and a directory path is resolved into a system role.

20. The computer readable medium of claim 15, wherein the instructions for deploying the plurality of nodes of the distributed directory-service-based system according to the generated distribution scheme further comprises instructions for iterating through the distribution scheme, and for each computing device in the domain:

establishing a connection to the computing device at the network address specified by the distribution scheme;

copying, to first computing device, a software package associated with a role assigned to the computing device according to the distribution scheme;

remotely installing the software package on the computing device; and transmitting a name, network address, and role identifier specified by the distribution scheme to a system core component to initialize the installed software package.

* * * * *